(12) United States Patent   (10) Patent No.: US 8,396,597 B2
Anderson                    (45) Date of Patent: Mar. 12, 2013

(54) DISTRIBUTED ROBOTIC GUIDANCE

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 626 days.

(21) Appl. No.: 12/543,176

(22) Filed: Aug. 18, 2009

(65) Prior Publication Data

US 2011/0046780 A1    Feb. 24, 2011

(51) Int. Cl.
    *G05B 19/00* (2006.01)
(52) U.S. Cl. ........ 700/259; 700/245; 700/250; 700/253; 701/2; 701/23; 701/28; 901/1; 901/47; 318/577
(58) Field of Classification Search .................. 700/245, 700/248, 250, 251, 253, 258, 259; 701/2, 701/23–26, 28, 50; 318/568.12, 568.16, 318/577; 901/1, 46, 47, 50; 56/10.2 A; 356/3–22, 356/138–155, 399–401, 603, 606
See application file for complete search history.

(56) References Cited

U.S. PATENT DOCUMENTS

| | | |
|---|---|---|
| 5,075,853 A | 12/1991 | Luke, Jr. |
| 5,684,476 A | 11/1997 | Anderson |
| 5,911,669 A | 6/1999 | Stentz et al. |
| 6,046,565 A | 4/2000 | Thorne |
| 6,191,813 B1 | 2/2001 | Fujisaki et al. |
| 6,584,390 B2 | 6/2003 | Beck |
| 6,615,570 B2 | 9/2003 | Beck et al. |
| 6,618,501 B1 | 9/2003 | Osawa et al. |
| 6,674,687 B2 | 1/2004 | Zeitzew |
| 6,839,127 B1 | 1/2005 | Anderson |
| 7,103,237 B2 | 9/2006 | Labelle |
| 7,164,118 B2 | 1/2007 | Anderson et al. |
| 7,286,624 B2 | 10/2007 | Woo et al. |
| 7,299,056 B2 | 11/2007 | Anderson |
| 7,299,057 B2 | 11/2007 | Anderson |
| 7,313,404 B2 | 12/2007 | Anderson |
| 7,853,356 B2 | 12/2010 | Tsai et al. |
| 2002/0027652 A1* | 3/2002 | Paromtchik et al. ....... 356/141.1 |
| 2005/0213082 A1* | 9/2005 | DiBernardo et al. .... 356/139.03 |
| 2006/0213167 A1* | 9/2006 | Koselka et al. ............ 56/10.2 A |
| 2007/0219666 A1 | 9/2007 | Filippov et al. |
| 2007/0244599 A1 | 10/2007 | Tsai et al. |
| 2008/0086241 A1 | 4/2008 | Phillips et al. |
| 2009/0037033 A1 | 2/2009 | Phillips et al. |
| 2009/0228166 A1 | 9/2009 | Durkos et al. |
| 2010/0222957 A1 | 9/2010 | Ohta et al. |

OTHER PUBLICATIONS

Cye, "Welcome to Mapping Your first collaboration with Cye," Accessed Mar. 29, 2006, http://www.personalrobots.com/cyetour/maptour/.*
EP Search report dated Oct. 13, 2011 regarding Application No. 10170134.0.
Castro et al., "A Multi-Loop Robust Navigation Architecture for Mobile Robots," Proceedings of the 1998 IEEE International Conference on Robotics & Automation, May 1988, pp. 970-975.

(Continued)

*Primary Examiner* — Khoi Tran
*Assistant Examiner* — Spencer Patton
(74) *Attorney, Agent, or Firm* — Yee & Associates, P.C.; Jeremy J. Westlake

(57) ABSTRACT

The different illustrative embodiments provide an apparatus that includes a computer system, a number of structured light generators, and a number of mobile robotic devices. The computer system is configured to generate a path plan. The number of structured light generators is configured to project the path plan. The number of mobile robotic devices is configured to detect and follow the path plan.

14 Claims, 9 Drawing Sheets

OTHER PUBLICATIONS

Guttman et al., "A Modular Architecture for Humanoid Robot Navigation," Proceedings of the 2005 5th IEEE-RAS International Conference on Humanoid Robots, Dec. 2005, pp. 26-31.

Wilson, "The Sensor Brick System," Thesis entitled "A Comparison of the Sensor Brick Concept as a Modular System Architecture to the Realtime Control System as the Operational Architecture," The University of Tennessee, Knoxville, Dec. 2005, pp. 45-72.

Adorni et al., "Omnidirectional Stereo Systems for Robot Navigation," IEEE Proceedings CVPR '03, Madison, Wisconsin, May 2003, 7 pages.

Cagnoni et al., "Hybrid Stereo Sensor with Omnidirectional Vision Capabilities: Overview and Calibration Procedures," 14th International Conference on Image Analysis an Processing, ICIAP, Modena, Italy, Sep. 10-14, 2007, 6 pages.

European Search Report dated May 26, 2011, regarding Application No. 10170224.9, 14 pages.

Roberti et al., "Geometry of a Hybrid Stereo Vision system for Robotics Applications," V. Jornadas Argentinas de Robotica, Nov. 2008, 6 pages.

"Educational Robots", CYE, 1 page, retrieved Jun. 18, 2009 http://www.personalrobots.com.

"First Affordable Personal Robot for Home and Office Launched by Probotics", Press Release May 12, 1999, pp. 1-2, CYE, retrieved Jun. 18, 2009 http://www.personalrobots.com/inthenews/pr/05121999.html.

* cited by examiner

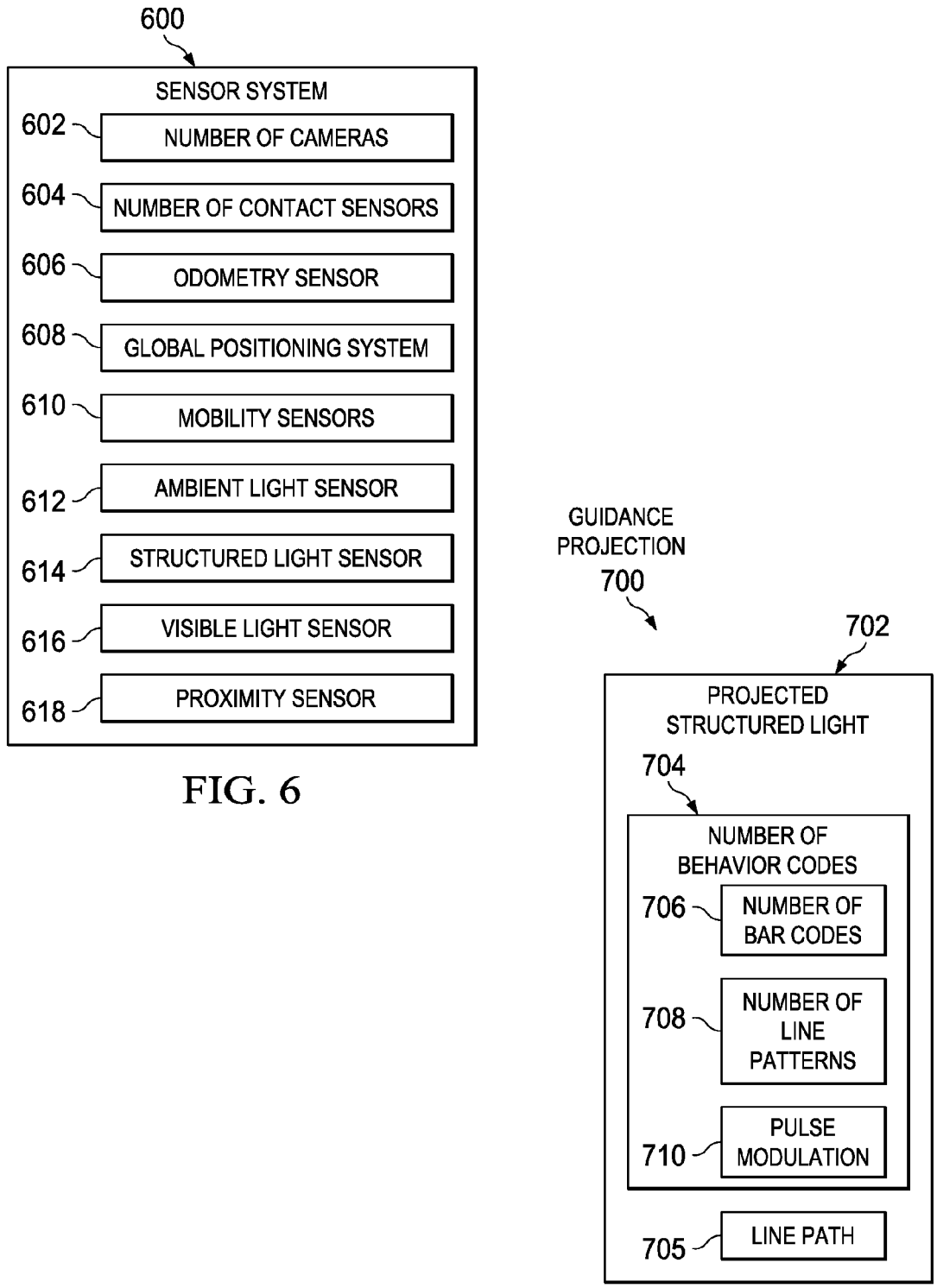

DISTRIBUTED ROBOTIC GUIDANCE

CROSS REFERENCE TO RELATED APPLICATIONS

This application is related to commonly assigned and co-pending U.S. patent application Ser. No. 12/543,152, filed on Aug. 18, 2009 and entitled "Modular and Scalable Positioning and Navigation System"; and U.S. patent application Ser. No. 12/543,127, filed on Aug. 18, 2009 and entitled "Asymmetric Stereo Vision System" all of which are hereby incorporated by reference.

FIELD OF THE INVENTION

The present invention relates generally to systems and methods for robotic navigation and more particularly to systems and methods for guiding mobile robotic devices. Still more specifically, the present disclosure relates to a method and system utilizing a structured light output for guiding mobile robotic devices.

BACKGROUND OF THE INVENTION

The use of robotic devices to perform physical tasks has increased in recent years. Mobile robotic devices can be used to perform a variety of different tasks. These mobile devices may operate in semi-autonomous or fully autonomous modes. Some robotic devices are constrained to operate in a contained area, using different methods to obtain coverage within the contained area. Mobile robotic devices often rely on dead reckoning or use of a global positioning system to achieve area coverage. These systems tend to be either inefficient or cost-prohibitive.

SUMMARY

One or more of the different illustrative embodiments provide a method for providing a path plan. A guidance projection using a three-dimensional map is generated. The guidance projection is then projected onto a contained area.

The different illustrative embodiments further provide a method for navigating a path. A guidance projection in a contained are is detected. A path within the guidance projection is identified. The path is then followed.

The different illustrative embodiments further provide an apparatus that includes a computer system, a number of structured light generators, and a number of mobile robotic devices. The computer system is configured to generate a path plan. The number of structured light generators is configured to project the path plan. The number of mobile robotic devices is configured to detect and follow the path plan.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

FIG. 6 is a block diagram of a sensor system in accordance with an illustrative embodiment;

FIG. 7 is a block diagram of a guidance projection in accordance with an illustrative embodiment;

DESCRIPTION OF THE PREFERRED EMBODIMENT

Figure 1:
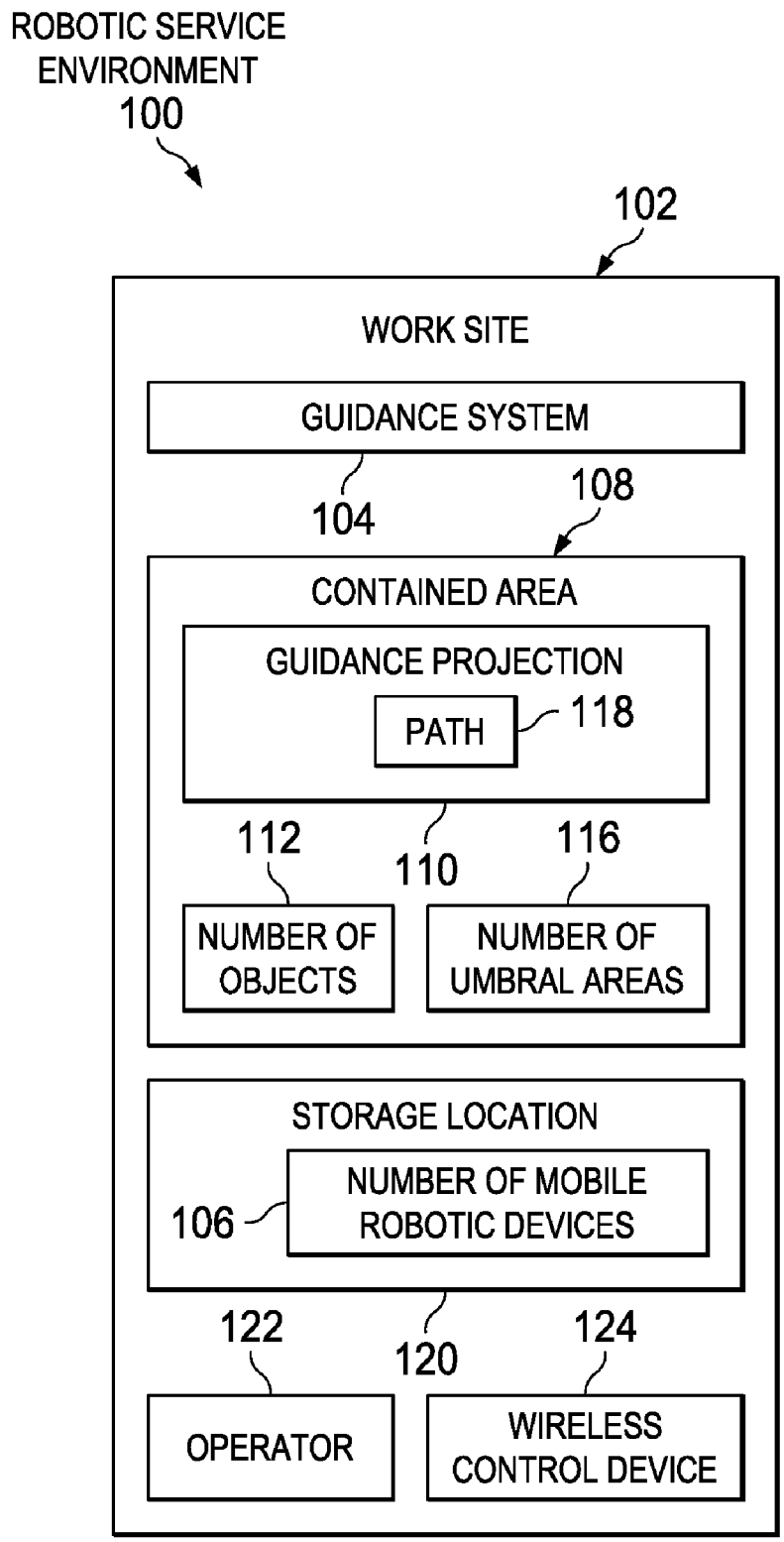
FIG. 1 is a block diagram of a robotic service environment in which an illustrative embodiment may be implemented.

With reference to the figures and in particular with reference to FIG. 1, a block diagram of a robotic service environment is depicted in which an illustrative embodiment may be implemented. Robotic service environment 100 may be any type of service environment in which a mobile robotic device can operate. In an illustrative example, robotic service environment 100 may be a structure, building, worksite, area, yard, indoor environment, outdoor environment, and/or any other suitable service environment or combination of service environments.

Robotic service environment 100 contains worksite 102. Worksite 102 includes guidance system 104, number of mobile robotic devices 106, and contained area 108. As used herein, a number refers to one or more items. Guidance system 104 provides a navigational path for number of mobile robotic devices 106. Contained area 108 includes guidance projection 110, number of objects 112, and number of umbral areas 116. Guidance projection 110 is the navigational path as projected by guidance system 104 onto contained area 108. Contained area 108 is a bounded area in which mobile robotic devices 106 work. Contained area 108 may be determined by human input, e.g., a human may input property boundaries, or by physical limitations. Physical limitations may include, without limitation, fences, walls, landscaping, water, or any other physical limitation that bounds contained area 108. Guidance projection 110 is in the form of a structured light emission and contains instructions for number of mobile robotic devices 106. Number of mobile robotic devices 106 performs tasks using the instructions included in guidance projection 110.

Number of objects 112 may include objects such as, without limitation, trees, fences, playground equipment, light poles, fire hydrants, walls, furniture, railings, fixtures and/or any other object that may be present in contained area 108. Number of umbral areas 116 occurs when number of objects 112 in worksite 102 block guidance projection 110 from being projected onto portions of contained area 108. An umbral area is a shadowed area. In an illustrative example, when guidance system 104 emits guidance projection 110 onto contained area 108, number of objects 112 in worksite 102 may create a shadow on a portion of contained area 108. This shadow is a result of structured light emitted by guidance projection 110 inadequately reaching every portion of contained area 108. This shadow is an example of an umbral area in number of umbral areas 116.

In an illustrative embodiment, number of mobile robotic devices 106 may operate within worksite 102. Guidance system 104 may project guidance projection 110 onto contained area 108. Number of mobile robotic devices 106 may identify and follow a path, such as path 118, within guidance projection 110.

In an illustrative embodiment, number of mobile robotic devices 106 is stored in storage location 120. Operator 122 may utilize wireless control device 124 to guide mobile robotic devices 106 between storage location 120 and contained area 108. Once number of mobile robotic devices 106 are within contained area 108, number of mobile robotic devices 106 operates using guidance projection 110.

In an illustrative embodiment, in portions of contained area 108 that are farthest from guidance system 104, guidance projection 110 may be faint and wide due to geometric expansion of the guidance projection. Methods known in the art for analyzing the intensity of the reflected light across the guidance projection may be used to better define any line projections in the guidance projection.

The illustration of robotic service environment 100 in FIG. 1 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

The different illustrative embodiments recognize and take into account that currently used methods for robotic navigation rely on dead reckoning or localization and path planning. Systems which rely on dead reckoning are inexpensive but also inefficient. Given enough time, a system relying on dead reckoning will probably cover the work area. However, the amount of time for 99.99% certainty that the total work area is covered may be very long. Additionally, systems which rely on localization and path planning system are more accurate and efficient in area coverage but often cost-prohibitive. One example of a localization and path planning system is a global positioning system using satellites. Precise area coverage can be achieved using this localization system. However, the main drawbacks are cost, energy consumption (e.g., battery operation reduction), and accuracy issues due to satellite signal obstructions. Signals from satellites may be replaced with acoustic or electromagnetic signals from ground sources which are then used by mobile robotic devices to triangulate position. However, overcoming accuracy requirement issues from signal topology, multi-path, attenuation, as well as power supply needs for beacons increases the system costs.

Thus, one or more of the different illustrative embodiments provide an apparatus that includes a computer system, a number of structured light generators, and a number of mobile robotic devices. The computer system is configured to generate a path plan. The number of structured light generators is configured to project the path plan. The number of mobile robotic devices is configured to detect and follow the path plan.

An illustrative embodiment further provides a method for providing a path plan. A guidance projection using a three-dimensional map is generated. The guidance projection is then projected onto a contained area.

An additional illustrative embodiment provides a method and system for navigating a path. A guidance projection in a contained area is detected. A path within the guidance projection is identified. The path is then followed.

Illustrative embodiments provide a guidance system for a mobile robotic device which enables safety, low cost, extended battery life or a smaller battery, and high quality area coverage. The illustrative embodiments contribute to a low robot weight which enhances safety, low cost, extended battery life or a smaller battery.

The features, functions, and advantages can be achieved independently in various embodiments of the present invention or may be combined in yet other embodiments in which further details can be seen with reference to the following description and drawings.

Figure 2:
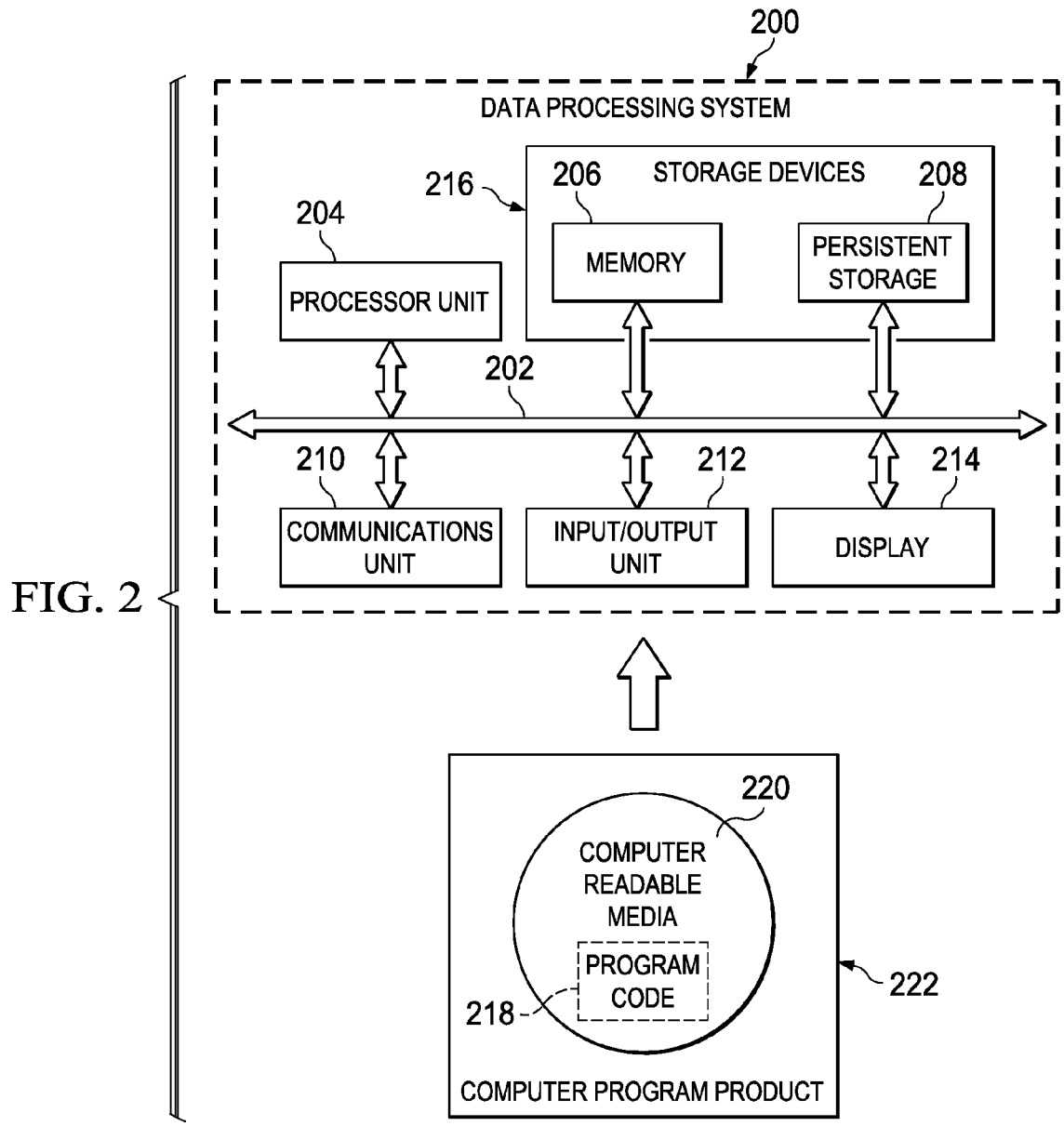
FIG. 2 is a block diagram of a data processing system in accordance with an illustrative embodiment.

With reference now to FIG. 2, a block diagram of a data processing system is depicted in accordance with an illustrative embodiment. Data processing system 200 may be used to implement different computers and data processing systems within a robotic service environment, such as guidance system 104 in FIG. 1.

In this illustrative example, data processing system 200 includes communications fabric 202, which provides communications between processor unit 204, memory 206, persistent storage 208, communications unit 210, input/output (I/O) unit 212, and display 214. Depending on the particular implementation, different architectures and/or configurations of data processing system 200 may be used.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer recordable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

Figure 3:
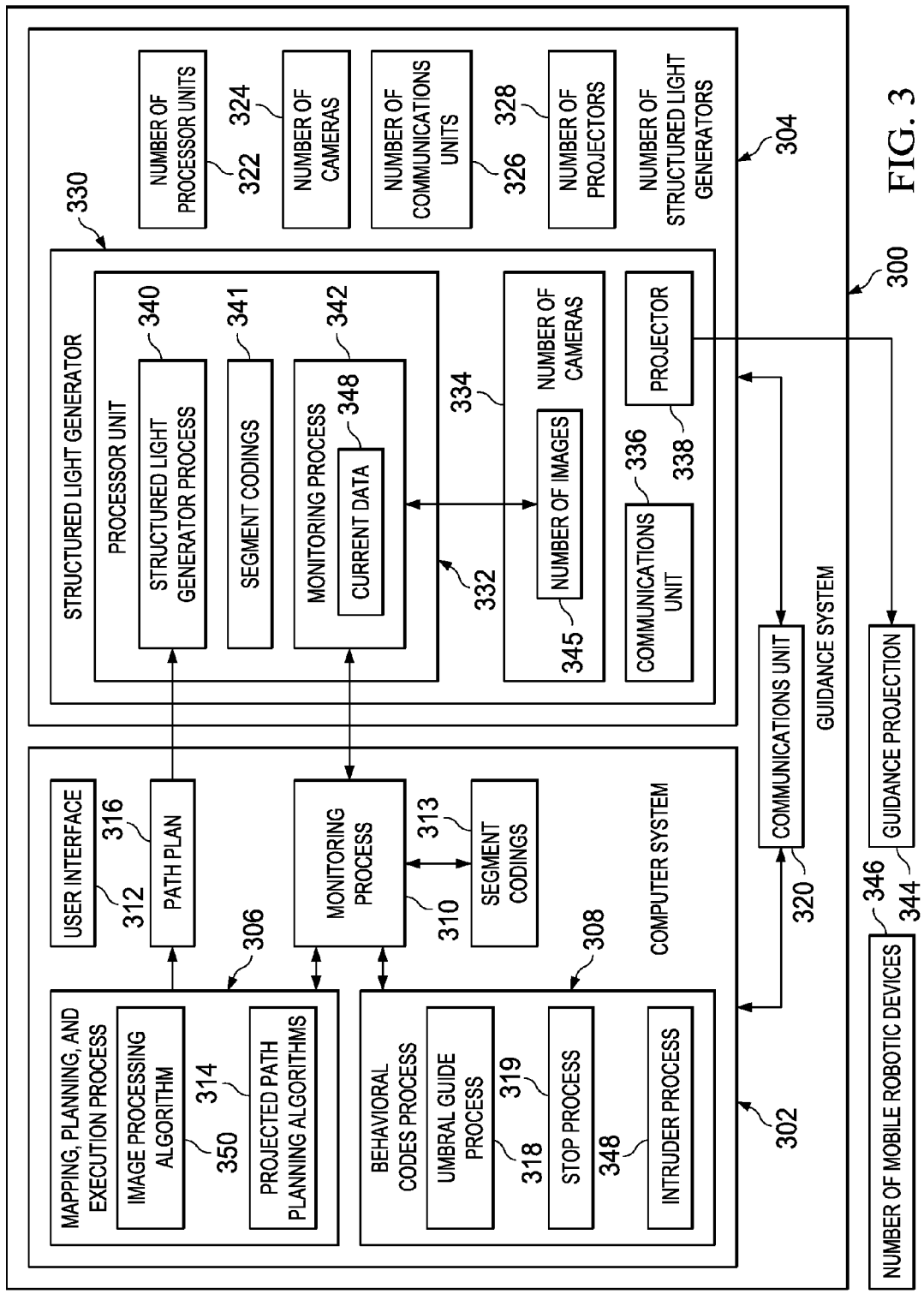
FIG. 3 is a block diagram of a guidance system in accordance with an illustrative embodiment.

With reference now to FIG. 3, a block diagram of a guidance system is depicted in accordance with an illustrative embodiment. Guidance system 300 includes computer system 302 and number of structured light generators 304. Guidance system 300 is an example of one implementation of guidance system 104 in FIG. 1.

Computer system 302 is configured to execute mapping, planning, and execution process 306, behavioral codes process 308, and monitoring process 310. Additionally, computer system 302 includes user interface 312 and segment codings 313. The mapping, planning, and execution process 306 may include projected path planning algorithms 314 to generate path plan 316. Projected path planning algorithms 314 may include algorithms such as a boustrouphadon cellular decomposition algorithm.

Behavioral codes process 308 provides navigational instructions to a mobile robotic device. Behavioral codes process 308 may provide navigational instruction implemented as a solid line which could mean "follow the line." Additionally, behavioral codes process 308 may provide navigational instruction implemented as a pattern such as "0101 0010" where "0" is no light projection and "1" is a light projection of a certain length. This pattern may be, for example, an encoding of the letter "R" based on the American Standard Code for Information Interchange (ASCII). ASCII is a character-encoding scheme based on the ordering of the English alphabet. In an illustrative example, when this type of pattern or encoding is detected, a mobile robotic device could interpret the encoded letter "R" as instruction to tightly go around an object detected on the mobile robotic device's "right" side until it encounters a solid line. This behavior continues even when the mobile robotic device is in the umbra of the given object. Behavioral codes process 308 may also provide instructions for the mobile robotic device that continue to guide the mobile robotic device even when the light projection or path plan is no longer visible.

Behavioral codes process 308 includes umbral guide process 318 and stop process 319. Umbral guide process 318 generates umbral guides. An umbral guide is a type of behavioral code. An umbral guide may be embedded within a guidance projection that provide guidance to a mobile robotic device in traversing a number of umbral areas, such as umbral areas 116 in FIG. 1. Computer system 302 communicates with a number of structured light generators 304 through communications unit 320. Communications unit 320 may provide communications links to number of structured light generators 304 and computer system 302. Communications unit 320 may take various forms. For example, communications unit 320 may include a wireless communications system, such as a cellular phone system, a Wi-Fi wireless system, a Bluetooth wireless system, or some other suitable wireless communications system. Further, communications unit 320 also may include a communications port, such as, for example, a universal serial bus port, a serial interface, a parallel port interface, a network interface, or some other suitable port to provide a physical communications link between computer system 302 and number of structured light generators 304.

Monitoring process 310 may monitor contained area 108 in FIG. 1, and number of mobile robotic devices 346 within the contained area using number of images 345 taken by number of cameras 324 of structured light generator 330, for example. Monitoring process 310 may identify guidance projection 344 in number of images 345. In an illustrative embodiment, guidance projection 334 may identify a line path in guidance projection 334 and compare the line segments of the identified line path to a reference line segment using segment codings 313. The distance between segments in the line path can be measured and compared to a reference segment length. The lengths and gaps can be interpreted using a coding scheme. Encoding scheme may include, but is not limited to ASCII, Morse code, and bar code. Segment codings 313 may be a database of segment and gap length references. Segment codings 313 may be located on computer system 302, or distributed across computer system 302, number of structured light generators 304, and/or number of mobile robotic devices 346.

Number of structured light generators 304 contains number of processor units 322, number of cameras 324, number of communications units 326, and number of projectors 328. Number of processor units 322 may be an example of one implementation of data processing system 200 in FIG. 2. Number of cameras 324 may include a web cam such as, for example, without limitation, Logitech QuickCam® webcam for Notebooks. (Quickcam® is a registered trademark of Logitech in the United States and/or other countries.) Number of communications units 326 may take various forms similar to communications unit 320. Number of projectors 328 may include, without limitation, Epson® S5 2000Lumen 3LCD Multimedia Projector. (Epson® is a registered trademark of Seiko Epson Corporation and Epson America, Inc. in the United States and other countries.)

Number of structured light generators 304 may be used in concert to emit path plan 316. A path plan is a set of navigational instructions that define the path a mobile robotic device may follow. Path plan 316 may include, for example, without limitation, instructions for guiding a number of mobile robotic devices, projecting decorative displays on a contained area, navigational instructions for the number of mobile robotic devices to follow even when the path plan or structured light is no longer visible, and/or any other suitable instructions. In the illustrative example of navigational instructions for after a path plan or structured light is no longer visible, path plan 316 may include navigational instructions to continue guidance of the mobile robotic device despite visibility limitations, for example. Structured light generator 330 is an example of one implementation of a structured light generator in number of structured light generators 304. Structured light generator 330 includes processor unit 332, number of cameras 334, communications unit 336, and projector 338. Processor unit 332 is configured to execute structured light generator process 340 and monitoring process 342. Structured light generator processor 340 may cause projector 338 to project guidance projection 344.

Guidance projection 344 is an emission of a light frequency. The light frequency emitted as guidance projection 344 may depend on a number of factors, including, without limitation, cost and performance of emitters and detectors, reflective properties in the environment, ambient light in the environment, eye safety for animals and humans, and/or any other factor. For example, guidance projection 344 may be an emission of near infrared light. Guidance projection 344 may emit light in a continuous or pulsed pattern.

In one illustrative embodiment, a pulsed pattern may allow a higher light intensity to be used while maintaining eye safety. In the illustrative example of pulsed light, there may be a need for an additional synchronization of structured light generator 330 and number of mobile robotic devices 346. There are a number of ways to synchronize the structured light generator and the number of mobile robotic devices, which are known in the art. One way to synchronize is to have clocks in structured light generator 330 and number of mobile robotic devices 346 synchronized. The pulsed pattern could be sent at the start of each new 0.1 second interval for whatever duration is desired.

In another illustrative embodiment, additional information could be encoded in guidance projection 344 using color, such as yellow=slow speed, green=medium speed, blue=maximum speed, for example. Monitoring process 342 may monitor contained area 108 in FIG. 1, and number of mobile robotic devices 346 within the contained area using number of images 345 taken by number of cameras 324.

In an illustrative example, monitoring process 342 may use number of images 345 to track the positions of number of mobile robotic devices 346 relative to guidance projection 344. The positions of number of mobile robotic devices 346 may then be used to ensure guidance projection 344 is available to mobile robotic devices 346 and/or to discontinue aspects of line following process 504. For example, one aspect of line following process 504 may be to direct a mobile robotic device down a line path contained in the guidance projection 344. This aspect may no longer be needed to direct number of mobile robotic devices 346 based on the position of number of mobile robotic devices 346.

Monitoring process 342 may also detect changes in contained area 108 in FIG. 1. For example, objects such as number of objects 112 in FIG. 1 could be moved, and as such, path plan 316 may need to be changed or stop process 319 may need to be implemented to instruct number of mobile robotic devices 346 to stop. Monitoring process 342 may further collect current data 348 from number of images 345. Current data 348 is the current state of the contained area. For example, current data may include, without limitation, the current state of vegetation growth or the current location of objects. Monitoring process 342 communicates with monitoring process 310 via communications unit 320. For example, monitoring process 342 may send number of images 345 to monitoring process 310. Monitoring process 310 may then send number of images 345 to mapping, planning, and execution process 306 and behavioral codes process 308. For example, number of images 345 may be used by mapping, planning, and execution process 306 to generate path plan 316. Number of images 345 may be used by mapping, planning, and execution process 306 to detect umbral areas and objects in a worksite. The images from number of cameras 324 may be processed using means known in the art to identify objects in a worksite.

Additionally, number of images 345 may be used to implement a security system. For example, number of images 345 could be used to detect a moving object, roughly the size and shape of a human, in a work site such as work site 102 in FIG. 1 at an unauthorized time, such as in the middle of the night for example. An intruder process 348 could be invoked to send a message via communications unit 320 to a designated operator, such as operator 122 in FIG. 1. The designated operator may include, but is not limited to, a home owner, worksite foreman, or police station.

Once mapping, planning, and execution process 306 generates path plan 316, path plan 316 is communicated to structured light generator process 340. Structured light generator process 340 then causes projector 338 to project guidance projection 344. Guidance projection 344 includes path plan 316. Guidance projection 344 is an example of implementation of guidance projection 110 in FIG. 1.

Number of mobile robotic devices 346 may detect guidance projection 344 and identify path plan 316 within guidance projection 344. Guidance projection 344 may be projected in a number of sections onto a contained area. Projecting in a number of sections includes projecting simultaneous sections and consecutive sections. Projecting simultaneous sections may be achieved by implementing, for example, a number of projectors, each projector simultaneously projecting a section of guidance projection 344 onto worksite 102 in FIG. 1. Projecting consecutive sections means one section is projected and then another section is projected until all sections have been projected. Projecting consecutive sections may be achieved by moving a projector.

In an illustrative embodiment, mapping, planning, and execution process 306 may further include means known in the art for vehicular navigation based on site-specific sensor quality data to increase the pass-to-pass overlap to compensate for increased uncertainty in position, thus reducing the likelihood of skips in the area coverage between passes.

The illustration of mobile guidance system 300 in FIG. 3 is not meant to imply physical or architectural limitations on the manner in which different advantageous embodiments may be implemented. Other components in addition or in place of the ones illustrated may be used. Some components may be unnecessary in some advantageous embodiments. Also, the blocks are presented to illustrate some functional components and combined and/or divided into different blocks when implemented in hardware and/or software.

Additionally, structured light generator process 340 may cause projector 338 to project decorative displays. Decorative displays may include, without limitation, holiday displays and game displays such as bounds for a badminton court or a four-square grid.

Figure 4:
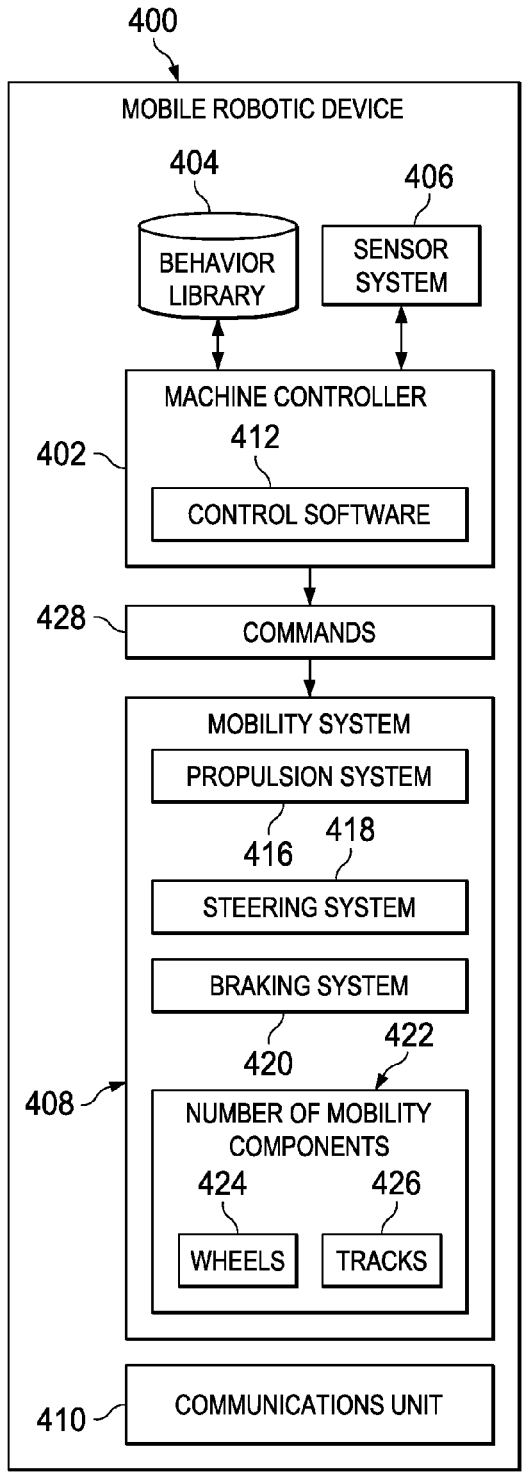
FIG. 4 is a block diagram of a mobile robotic device in accordance with an illustrative embodiment.

With reference now to FIG. 4, a block diagram of a mobile robotic device is depicted in accordance with an illustrative embodiment. Mobile robotic device 400 is an example of one implementation of number of mobile robotic devices 346 in FIG. 3 and number of mobile robotic devices 106 in FIG. 1.

As illustrated, mobile robotic device 400 includes machine controller 402, behavior library 404, sensor system 406, mobility system 408, and communications unit 410.

Machine controller 402 includes, for example, control software 412. Machine controller 402 may be, for example, a data processing system, such as data processing system 200 in FIG. 2, or some other device that may execute processes to control movement of mobile robotic device 400. Machine controller 402 may be, for example, a computer, an application integrated specific circuit, and/or some other suitable device.

Machine controller 402 may execute processes using control software 412 to control mobility system 408. Mobility system 408 includes, for example, propulsion system 416, steering system 418, braking system 420, and number of mobility components 422. Machine controller 402 may execute processes using control software 412 to access information within control behavior library 404 and sensor system 406. Machine controller 402 may send various commands 428 to these components to operate the mobile robotic device in different modes of operation. Commands 428 may take various forms depending on the implementation. For example, the commands may be analog electrical signals in which a voltage and/or current change is used to control these systems. In other implementations, the commands may take the form of data sent to the systems to initiate the desired actions.

In these examples, propulsion system 416 may propel or move mobile robotic device 400 in response to commands from machine controller 402. Propulsion system 416 may maintain or increase the speed at which a mobile robotic device moves in response to instructions received from machine controller 402. Propulsion system 416 may be an electrically controlled propulsion system. Propulsion system 416 may be, for example, an internal combustion engine, an internal combustion engine/electric hybrid system, an electric engine, or some other suitable propulsion system.

Steering system 418 may control the direction or steering of mobile robotic device 400 in response to commands received from machine controller 402. Steering system 418 may be, for example, an electrically controlled hydraulic steering system, an electrically driven rack and pinion steering system, an Ackerman steering system, a skid-steer steering system, a differential steering system, or some other suitable steering system.

Braking system 420 may slow down and/or stop mobile utility vehicle 400 in response to commands from machine controller 402. Braking system 420 may be an electrically controlled braking system. This braking system may be, for example, a hydraulic braking system, a friction braking system, a regenerative braking system, or some other suitable braking system that may be electrically controlled.

Number of mobility components 422 may provide the means for transporting mobile robotic device 400. Number of mobility components 422 includes, without limitation, wheels 424 and tracks 426.

Sensor system 406 may be a set of sensors used to collect information about the environment around a mobile robotic device. In these examples, the information is sent to machine controller 402 or computer system 302 in FIG. 3, to provide data in identifying the guidance projection/path plan and the environment surrounding mobile robotic device 400.

Behavior library 404 contains various behavioral processes specific to mobile robotic device coordination that can be called and executed by machine controller 402. Control software 412 may access behavior library 404 to identify and/or select behavioral processes to be executed by machine controller 402.

Communication unit 410 may provide multiple communications links to machine controller 402 to receive information. This information includes, for example, data, commands, and/or instructions.

Communication unit 410 may take various forms. For example, communication unit 410 may include a wireless communications system, such as a cellular phone system, a Wi-Fi wireless system, a Bluetooth wireless system, and/or some other suitable wireless communications system. Further, communication unit 410 also may include a communications port, such as, for example, a universal serial bus port, a serial interface, a parallel port interface, a network interface, and/or some other suitable port to provide a physical communications link.

The illustration of mobile robotic device 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
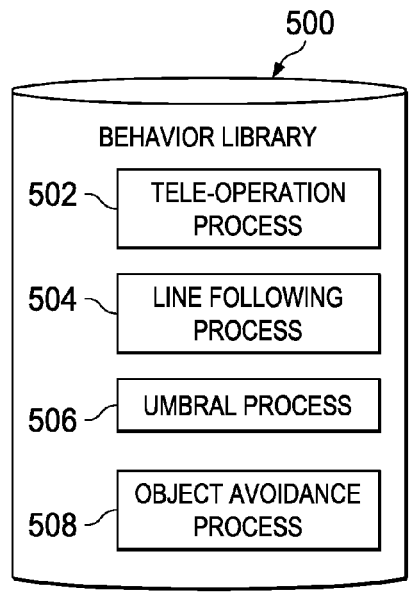
FIG. 5 is a block diagram of a behavior library in accordance with an illustrative embodiment.

With reference now to FIG. 5, a block diagram of a behavior library is depicted in accordance with an illustrative embodiment. Behavior library 500 is an example of one implementation of behavior library 404 in FIG. 4.

As illustrated, behavior library 500 includes various behavioral processes for the mobile robotic device that can be called and executed by a machine controller, such as machine controller 402 in FIG. 4. The behavioral processes depicted in FIG. 5 are only examples of some possible processes and are not meant to limit the invention in any way.

Behavior library 500 includes, for example, tele-operation process 502, line following process 504, umbral process 506, and object avoidance process 508.

Tele-operation process 502 allows an operator, such as operator 122 in FIG. 1, outside the robotic device to operate the robotic device using a wireless control device such as wireless control device 124 in FIG. 1. For example, tele-operation process may be used to move a mobile robotic device between a storage location, such as storage location 120 in FIG. 1, and a contained area.

Line following process 504 utilizes a number of images from a number of cameras associated with a sensor system, such as sensor system 406 in FIG. 4, to locate a guidance projection, such as guidance projection 344 in FIG. 3. Once line following process 504 finds a line path contained in the guidance projection, line following process 504 directs a mobile robotic device down the line path by keeping the line path within a target range of pixels in future images. A target range of pixels will depend on the line path as well as the design parameters of the number of cameras capturing the number of images. Design parameters for the number of cameras may include, for example, mounting position and angle, sensor resolution, and optical field of view.

In an illustrative example, a range of pixels may be defined so the left side of the range is lined up roughly with the line path of the guidance projection, such as guidance projection 344 in FIG. 3. The right side of the range of pixels may be defined by a certain distance to pixels in images captured that include the line path pixels. In this example, as long as the line path is within the range of pixels, the mobile robotic device may be considered as correctly following curb the line path.

The line path may be found by filtering all colors other than the guidance projection color out of the image and then skeletonizing the remaining pixel group(s). Skeletonizing the remaining pixel group(s) is the process of removing as many pixels as possible without affecting the general shape of the line path. Line following process 504 may further utilize a number of images to identify the length of line segments in the line path and then compare the identified line segment lengths to a reference line segment length. Similarly, the distance between segments in the line path can be measured and compared to a reference segment length. The lengths and gaps can be interpreted using a coding scheme. Encoding scheme may include, but is not limited to ASCII, Morse code, and bar code. Reference line segment length may be obtained using a segment codings database, such as segment coding 313 or segment coding 341 in FIG. 3, for example. The segment codings database may also be accessed by a machine controller on a mobile robotic device, such as machine controller 402 in FIG. 4 for example.

Umbral process 506 may be used when mobile robotic device receives behavioral codes which include umbral guides. Object avoidance process 508 may be used in conjunction with one or more of the other behavior processes in behavior library 500 to direct the vehicle movement around a detected object.

Elements of behavior library 500, such as tele-operation process 502, line following process 504, umbral process 506, and object avoidance process 508 may be used independently or in any combination.

The illustration of behavior library 500 in FIG. 5 is not meant to imply physical or architectural limitations to the manner in which different advantageous embodiments may be implemented. For example, in an illustrative embodiment behavior library 500 may be centrally located on a mobile robotic device, such as a mobile robotic device in number of mobile robotic devices 346 in FIG. 3, and/or distributed among guidance system 300 in FIG. 3 and number of mobile robotic devices 346 in FIG. 3. In another illustrative embodiment, there may be multiple copies of behavior library 500 on a mobile robotic device in order to provide redundancy. Behavior library 500 may have behaviors added, deleted, or modified. Database design and operation are well known in the art. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 6, a block diagram of a sensor system is depicted in accordance with an illustrative embodiment. Sensor system 600 is an example of one implementation of sensor system 406 in FIG. 4.

As illustrated, sensor system 600 includes, for example, number of cameras 602, number of contact sensors 604, odometry sensor 606, global positioning system 608, mobility sensors 610, ambient light sensor 612, structured light sensor 614, visible light sensor 616, and proximity sensor 618. These different sensors may be used to identify the operating environment around a mobile robotic device, such as robotic service environment 100 in FIG. 1 for example. The sensors in sensor system 600 may be selected such that one of the sensors is always capable of sensing information needed to operate the mobile robotic device in different operating environments.

Number of cameras 602 may be a standard still-image camera, which may be used alone for color information or with a second camera to generate stereoscopic, or three-dimensional, images. When the number of cameras 602 is used along with a second camera to generate stereoscopic images, the two or more cameras may be set with different exposure settings to provide improved performance over a range of lighting conditions. Number of cameras 602 may also be a video camera that captures and records moving images. Number of cameras 602 may be capable of taking images of the environment near or around a mobile robotic device, such as mobile robotic device 400 in FIG. 4.

The images from number of cameras 602 may be processed using means known in the art to identify a guidance projection or objects in an environment. For example, images from number of cameras 602 may be processed by monitoring process 324 or monitoring process 306 in FIG. 3.

Global positioning system 608 may identify the location of the mobile robotic device with respect to other objects in the environment. Global positioning system 608 may be any type of radio frequency triangulation scheme based on signal strength and/or time of flight. Examples include, without limitation, the Global Positioning System, Glonass, Galileo, and cell phone tower relative signal strength. Position is typically reported as latitude and longitude with an error that depends on factors, such as ionospheric conditions, satellite constellation, and signal attenuation from vegetation. Signals from satellites may be replaced with acoustic or electromagnetic signals from ground sources, which are then used by a mobile robotic device to triangulate position.

Mobility sensors 610 are used to safely and efficiently move a mobile robotic device, such as mobile robotic device 106 in FIG. 1, within a worksite, such as worksite 102 in FIG. 1, for example. Mobility sensors 610 may include, for example, without limitation, a compass for dead reckoning, vision and ultrasonic sensors for object detection, and/or any other suitable sensor. Number of contact sensors 604 and proximity sensor 618 may sense objects which are near or in contact with a mobile robotic device. For example number of contact sensors 604 and proximity sensor 618 may be implemented as a bumper switch. Odometry sensor 606 may indicate how far the robot has traveled, based, for example, on the amount that the wheels have turned.

Ambient light sensor 612 measures the amount of ambient light in an environment. Structured light sensor 614 reads structured light projections of a guidance projection, through a camera, and interprets the detected structured light. Structured light sensor 614 may be used to detect objects in an environment. Visible light sensor 616 measures the amount of visible light in an environment. The data collected from ambient light sensor 612 and visible light sensor 616 may be used in selecting an image processing algorithm, such as image processing algorithm 350 in FIG. 3. For example, in bright light, it may be preferred to capture a first image of contained area 108 in FIG. 1 with an emitted guidance projection such as guidance projection 110 in FIG. 1, and a second image of contained area 108 in FIG. 1 without the guidance projection. Using the image processing algorithm the second image may be subtracted from the first image, leaving the guidance projection. When it is dark, this extra image collection and processing may not be needed.

In an illustrative embodiment, sensor system 600 communicates with machine controller 402 in FIG. 4. Sensor system 600 communicates sensor data about the operating environment to machine controller 402. Machine controller 402 may then communicate data received from sensor system 600 to guidance system 300 in FIG. 3. Data received from sensor system 600 may be used in mapping, planning, and execution process 306.

In another illustrative embodiment, sensor system 600 communicates with machine controller 402 in FIG. 4. Machine controller 402 may access data from behavior library 404 and use behavioral data in conjunction with sensor data from sensor system 600 to execute umbral process 506 and object avoidance process 508 in FIG. 5.

The illustration of sensor system 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 7, a block diagram of a guidance projection is depicted in accordance with an illustrative embodiment. Guidance projection 700 is an example of one implementation of guidance projection 110 in FIG. 1 and guidance projection 344 in FIG. 3.

Guidance projection includes projected structured light 702. Projected structured light 702 includes number of behavior codes 704 and line path 705. The number of behavior codes 704 includes, for example, without limitation, at least one of number of bar codes 706, number of line patterns 708, and pulse modulation 710. The frequency, duty cycle, and intensity of projected structured light 702 is selected to be easily visible to a mobile robotic device and eye-safe for people and pets in the area. Frequency, duty cycle, and intensity of projected structured light that is easily visible to a mobile robotic device and eye-safe for people and pets in the area is known in the art.

In an illustrative embodiment, projected structured light 702 is projected as line path 705. A mobile robotic device follows line path 705. The mobile robotic device first locates line path 705 using a number of cameras, such as number of cameras 602 in FIG. 6. The mobile robotic device then follows line path 705. Line following is one of the simplest robot behaviors and enables a low energy, low computation, low cost means of guidance.

In another illustrative embodiment, which may be implemented independently or in conjunction with the previous illustrative embodiment, projected structured light 702 is projected as a number of behavior codes 704. Number of behavior codes 704 may include umbral guides created by umbral guide process 318 in FIG. 3. The umbral guides or behavior codes 704 may be projected as structured light in the form of number of bar codes 706, number of line patterns 708, and pulse modulation 710. A mobile robotic device follows number of behavior codes 704 using images collected from a number of cameras, such as number of cameras 602 in FIG. 6.

The illustration of guidance projection 700 in FIG. 7 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
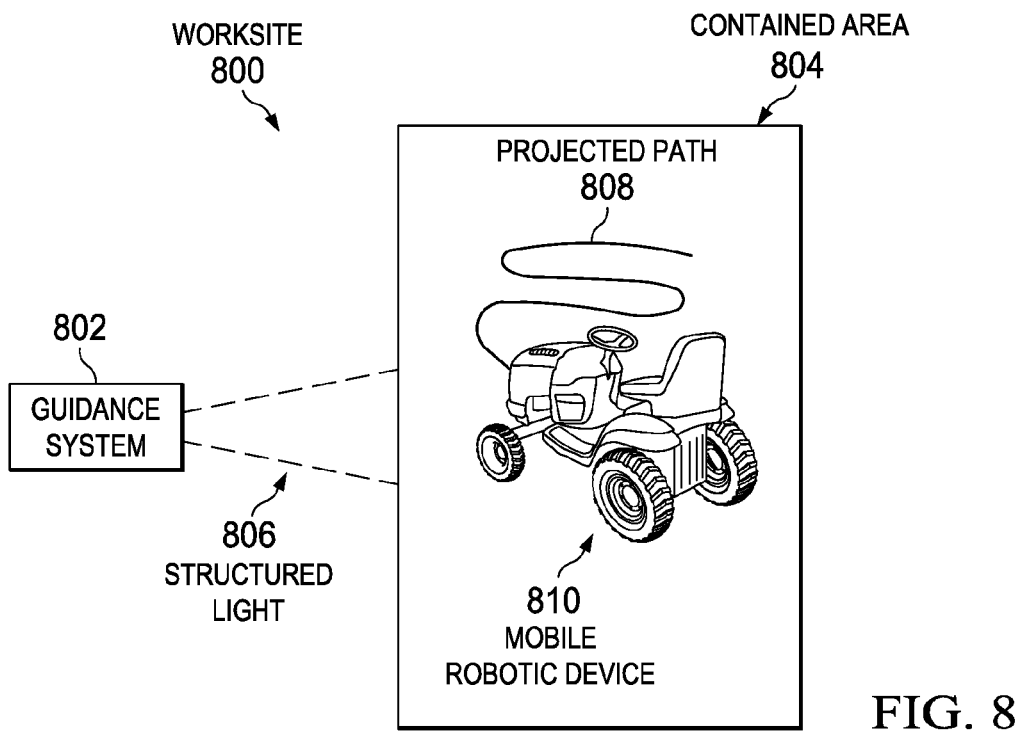
FIG. 8 is a block diagram of a worksite in accordance with an illustrative embodiment.

With reference now to FIG. 8, a block diagram of a worksite is depicted in accordance with an illustrative embodiment. Worksite 800 is an example of one implementation of worksite 102 in FIG. 1.

Worksite 800 includes guidance system 802 and contained area 804. The guidance system 802 emits structured light 806 onto contained area 804. Structured light 806 is an example of one implementation of projected structured light 702 in FIG. 7. The structured light forms projected path 808 for mobile robotic device 810 to follow. Projected path 808 is an example of guidance projection 110 in FIG. 1 and guidance projection 344 in FIG. 3. Projected path 808 may be implemented in the form of a line path, such as line path 705 in FIG. 7 or a number of behavior codes, such as number of behavior codes 704 in FIG. 7. Additionally, projected path 808 may be implemented as a combination of a line path or a number of behavior codes.

In an illustrative embodiment, guidance system 802 projects projected path 808 in its entirety. Projecting a projected path in its entirety means the projected path is projected in one piece by one projector rather than in a number of segments and/or by a number of projectors.

The illustration of worksite 800 in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
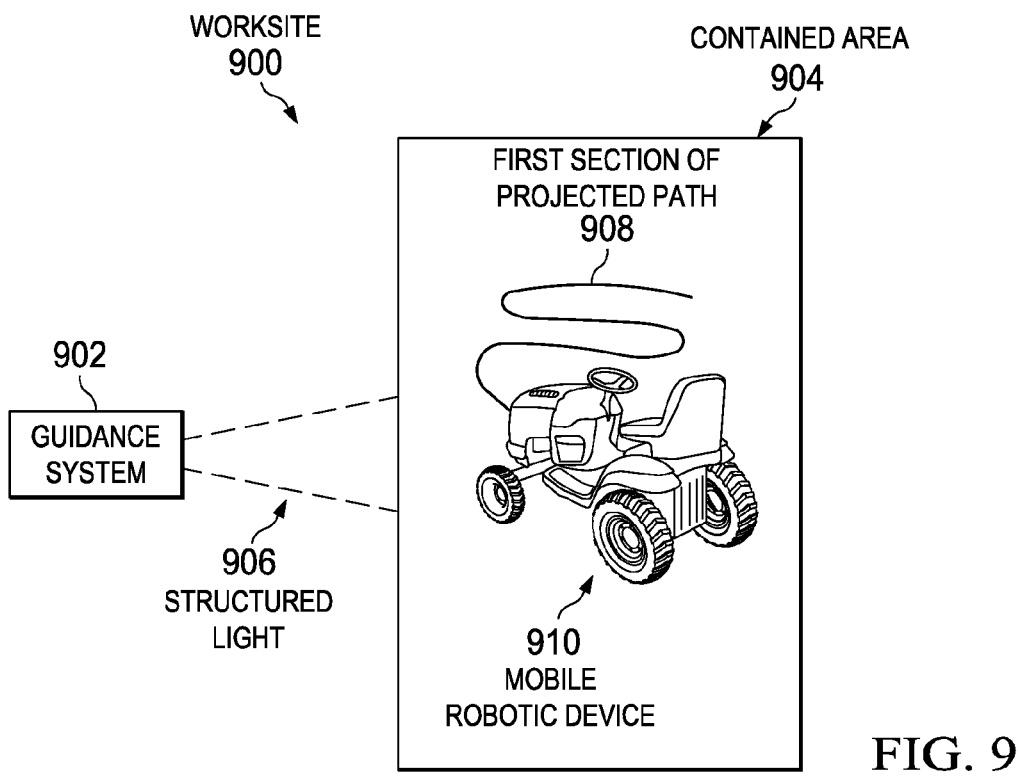
FIG. 9 is a block diagram of a worksite in accordance with an illustrative embodiment.

With reference now to FIG. 9, a block diagram of a worksite is depicted in accordance with an illustrative embodiment. Worksite 900 is an example of one implementation of worksite 102 in FIG. 1.

Worksite 900 includes guidance system 902 and contained area 904. The guidance system 902 emits structured light 906 onto a portion of contained area 904. Structured light 906 is an example of one implementation of projected structured light 702 in FIG. 7. The structured light forms a first section of projected path 908, for mobile robotic device 910 to follow. The first section of projected path 908 may be implemented in the form of a line path, such as line path 705 in FIG. 7 or a number of behavior codes, such as number of behavior codes 704 in FIG. 7. Additionally, the first section of projected path 908 may be implemented as a combination of a line path or a number of behavior codes.

The illustration of worksite 900 in FIG. 9 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
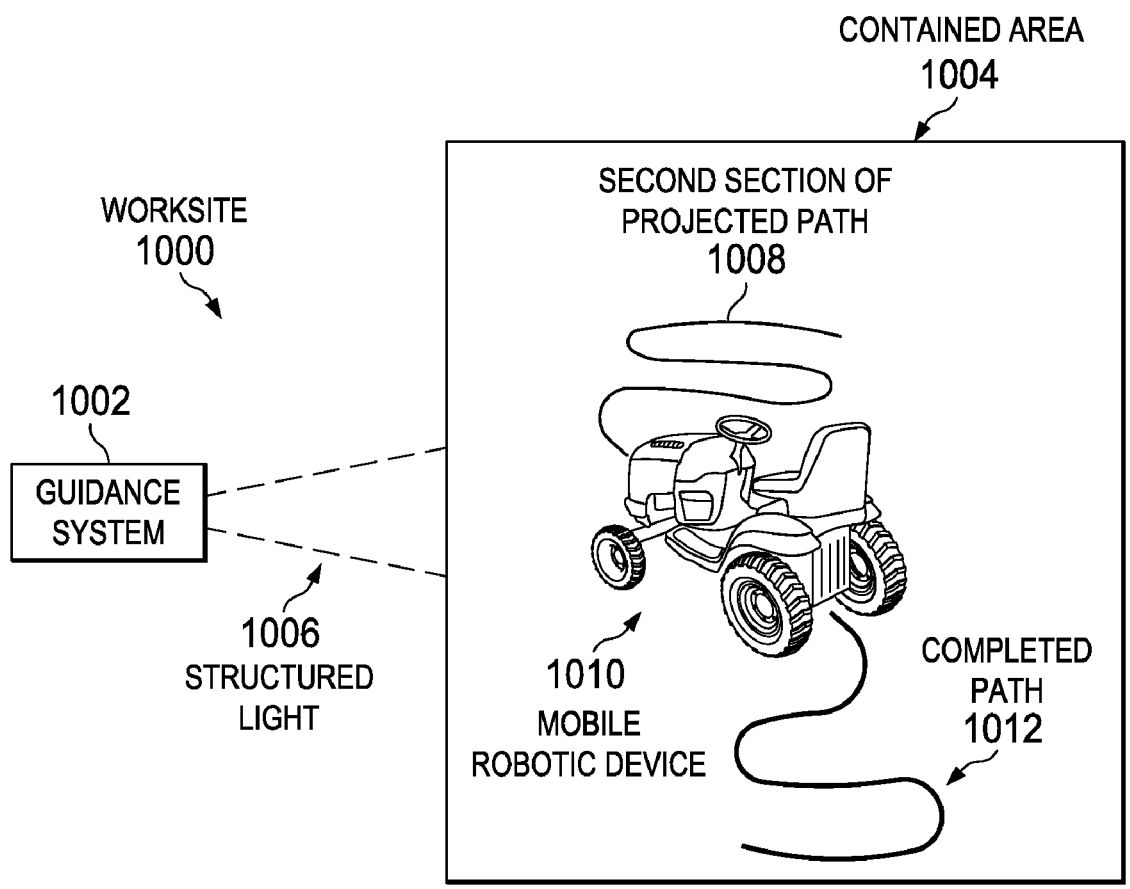
FIG. 10 is a block diagram of a worksite in accordance with an illustrative embodiment.

With reference now to FIG. 10, a block diagram of a worksite is depicted in accordance with an illustrative embodiment. Worksite 1000 is an example of one implementation of worksite 102 in FIG. 1.

Worksite 1000 includes guidance system 1002 and contained area 1004. The guidance system 1002 emits structured light 1006 onto a portion of contained area 1004. Structured light 1006 is an example of one implementation of projected structured light 702 in FIG. 7. The structured light forms a second section of projected path 1008 for mobile robotic device 1010 to follow. The second section of projected path 1008 is emitted following a first section of projected path having been emitted, such as first section of projected path 908. Responsive to a first section of a projected path having been emitted onto the contained area 1004 and the mobile robotic device 1008 having followed the first section of the project path to the end of the first section of the projected path, completed path 1012 is formed. The second section of projected path 1008 may be implemented in the form of a line path, such as line path 705 in FIG. 7 or a number of behavior codes, such as number of behavior codes 704 in FIG. 7. Additionally, the second section of projected path 1008 may be implemented as a combination of a line path or a number of behavior codes.

In an illustrative embodiment, a guidance projection, such as guidance projection 344 in FIG. 3, may be projected as a number of sections onto a contained area. Projecting a number of sections may include projecting a number of sections consecutively. Projecting the sections consecutively means one section is projected and then another section is projected until all sections have been projected. Projecting consecutive sections may be achieved by moving a projector.

The illustration of worksite 1000 in FIG. 10 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 11:
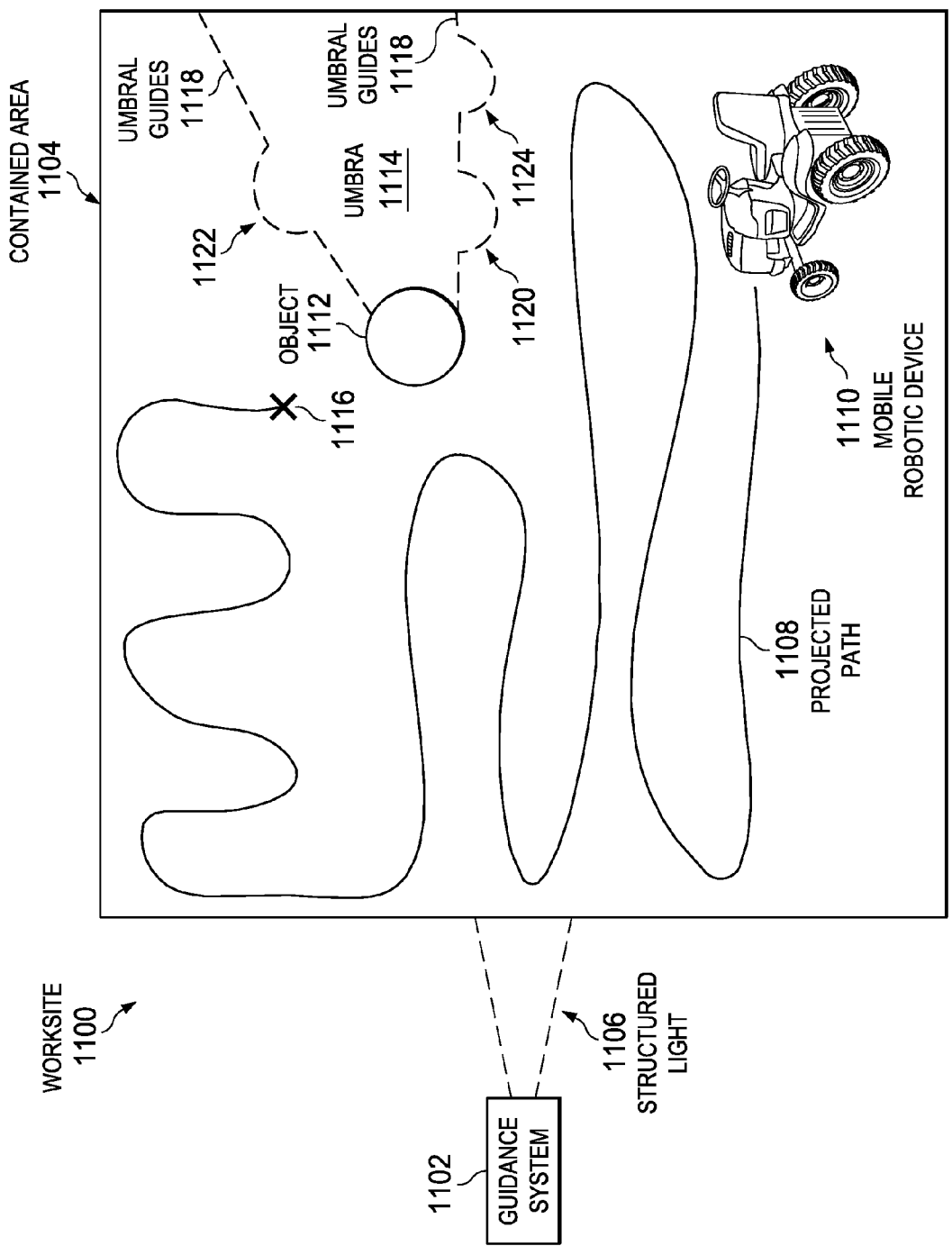
FIG. 11 is a block diagram of a work site in accordance with an illustrative embodiment.

With reference now to FIG. 11, a block diagram of a work site is depicted in accordance with an illustrative embodiment. Worksite 1100 is an example of one implementation of worksite 102 in FIG. 1.

Worksite 1100 includes guidance system 1102 and contained area 1104. The guidance system 1102 emits structured light 1106 onto contained area 1104. Structured light 1106 is an example of one implementation of projected structured light 702 in FIG. 7. The structured light forms projected path 1108, for mobile robotic device 1110 to follow. The mobile robotic device follows projected path 1108 using a number of cameras, such as number of cameras 602 in FIG. 6. The projected path 1108 may be implemented in the form of a line path, such as line path 705 in FIG. 7 or a number of behavior codes, such as number of behavior codes 704 in FIG. 7. Additionally, the projected path 1108 may be implemented as a combination of a line path or a number of behavior codes. Contained area 1104 further includes object 1112 which creates umbra 1114. Structured light 1106 is occluded by object 1112, and as such, structured light 1106 cannot project projected path 1108 into umbra 1114.

Mobile robotic device 1110 may follow projected path 1108 until it ends at point 1116. Because object 1112 creates umbra 1114 that precludes structured light 1106 from projecting projected path 1108 into umbra 1114, umbral guides 1118 are used to traverse umbra 1114. Mobile robotic device 1110 uses umbral guides 1118 as landmarks for localization and guidance. Mobile robotic device 1110 may then access a number of umbral behaviors located in behavior library 500 in FIG. 5 to perform area coverage in umbra 1114.

In an illustrative embodiment, mobile robotic device 1110 follows projected path 1108 until it ends at 1116. Object 1112 may be avoided and umbra 1114 may be traversed with a sequence of two umbral behaviors. The first umbral behavior would be to circle the object once. The second umbral behavior would be to lock onto semi-circle 1120 on the lower portion of umbral guides 1118 and follow semi-circle 1120 to make a first turn. Then lock onto semi-circle 1122 directly across umbra 1114 and on the upper portion of umbral guides 1118 to traverse umbra 1114, and to follow semi-circle 1122 on the upper portion of umbral guides 1118 to make a second turn. Next lock onto semi-circle 1124 directly across umbra 1114 and on the lower portion of umbral guides 1118 to traverse umbra 1114, and finally to follow semi-circle 1124 on the lower portion of umbral guides 1118 to make a third turn.

The illustration of worksite 1100 in FIG. 11 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 12:
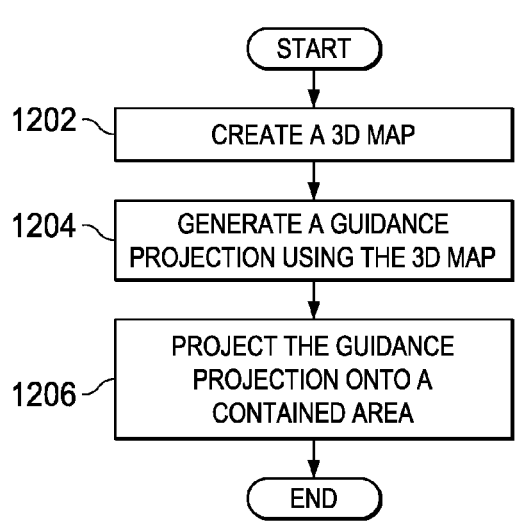
FIG. 12 is a flowchart illustrating a process for generating a guidance projection in accordance with an illustrative embodiment.

With reference now to FIG. 12, a flowchart illustrating a process for generating a guidance projection is depicted in accordance with an illustrative embodiment. This process may be implemented by mapping, planning, and execution process 306 in FIG. 3.

The process begins by creating a three-dimensional map of a contained area, using a guidance system such as guidance system 300 in FIG. 3 (step 1202). In an illustrative embodiment, a structured light generator projects dots or lines of light onto worksite 102 in FIG. 1 and takes a number of images. The three dimensional map may include one or more of the topography of the surface of the work site 102 in FIG. 1 and geometry of number of objects 112 in FIG. 1. The number of images is communicated to a mapping, planning, and execution process such as mapping, planning, and execution process 306 in FIG. 3. The mapping, planning, and execution process creates a three-dimensional map using the number of images.

The process then generates a guidance projection, using the three-dimensional map (step 1204). The guidance projection includes a path plan such as path plan 316 in FIG. 3. The process generates the guidance projection using projected path planning algorithms such as projected path planning algorithms 314 in FIG. 3, for example. The process then projects the guidance projection onto a contained area (step 1206), with the process terminating thereafter. The process may transmit the generated guidance projection to a structured light generator process, such as structured light generator process 340 in FIG. 3, for example. The structured light generator processor communicates with a projector component, such as projector 338 in FIG. 3, to project the guidance projection onto the contained area.

Figure 13:
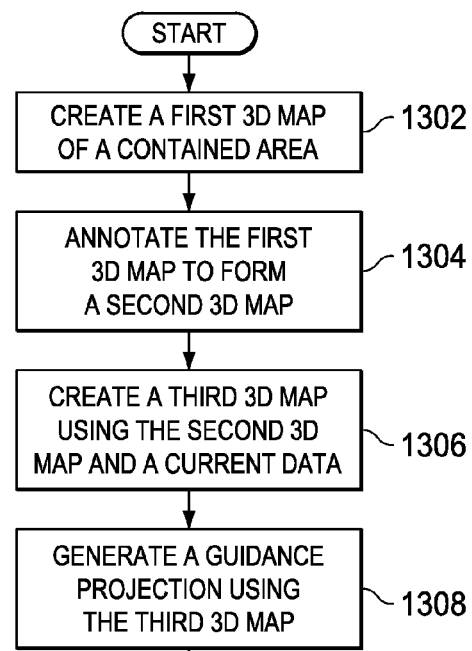
FIG. 13 is a flowchart illustrating a process for generating a guidance projection in accordance with an illustrative embodiment.

With reference now to FIG. 13, a flowchart illustrating a process for generating a guidance projection is depicted in accordance with an illustrative embodiment. This process may be implemented by mapping, planning, and execution process 306 in FIG. 3.

The process begins by creating a first three-dimensional map of a contained area (step 1302). A first three-dimensional map may be created prior to an occluding season. An occluding season is a time of year in which nature greatly occludes the surface. Examples of occluding seasons, without limitation, are growing seasons such as late spring and summer when vegetation is most active and snow seasons. Thus, prior to a growing season such as very early spring when vegetation is minimal and very early winter before snow has fallen are the best times to create the first three-dimensional map. A growing season is the time of year when climatic conditions are favorable for plant growth.

The process then annotates the first three-dimensional map to form a second three-dimensional map (step 1304). Annotations may be made by a human using a user interface, such as user interface 312 in FIG. 3. Alternatively, or in addition, the mobile robotic device may be used to generate annotations in tele-operation mode implemented by tele-operation process 502 in FIG. 5. Annotations may include, without limitation, contained area boundaries, stationary or persistent objects such as fence posts. Stationary or persistent objects may be used for supplemental localization landmarks. A localization landmark is a geographic feature that is used for determining a position or location of an object.

Next, the process creates a third three-dimensional map using the second three-dimensional map and a current data (step 1306). Current data may include, without limitation, a current three-dimensional map that may include increased vegetation and new objects. In an illustrative embodiment, a structured light generator projects dots or lines of light onto worksite 102 in FIG. 1 and takes a number of current images such as number of images 345. The number of current images is communicated to a mapping, planning, and execution process such as mapping, planning, and execution process 306 in FIG. 3. The mapping, planning, and execution process creates a current three-dimensional map using the current number of images. If new objects appear, software, such as software associated with mapping, planning, and execution process 306 in FIG. 3 may use default behaviors for operating in umbral areas or query for human input in selecting behaviors. The process then generates a guidance projection using the third three-dimensional map (step 1308). The guidance projection is generated by mapping, planning, and execution process 306 in FIG. 3. Mapping, planning, and execution process 306 in FIG. 3 may use projected path planning algorithms such as a boustrouphadon cellular decomposition algorithm, for example. The process projects the guidance projection onto a contained area (step 1310), with the process terminating thereafter.

Figure 14:
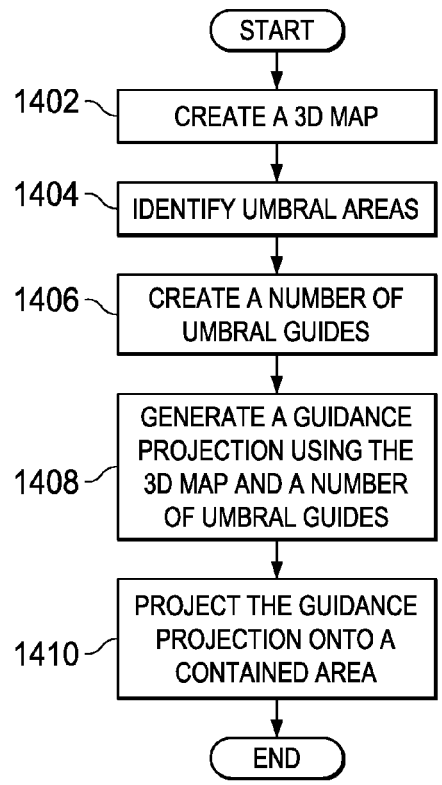
FIG. 14 is a flowchart illustrating a process for generating a guidance projection in accordance with an illustrative embodiment.

With reference now to FIG. 14, a flowchart illustrating a process generating a guidance projection is depicted in accordance with an illustrative embodiment. This process may be implemented by mapping, planning, and execution process 306 in FIG. 3.

The process begins by creating a three-dimensional map (step 1402). The three-dimensional map may comprise a contained area. The process identifies umbral areas (step 1404). The process creates a number of umbral guides (step 1406) for the umbral areas identified. The process generates a guidance projection using the three-dimensional map and the number of umbral guides (step 1408). The process then projects the guidance projection onto a contained area (step 1410), with the process terminating thereafter.

Figure 15:
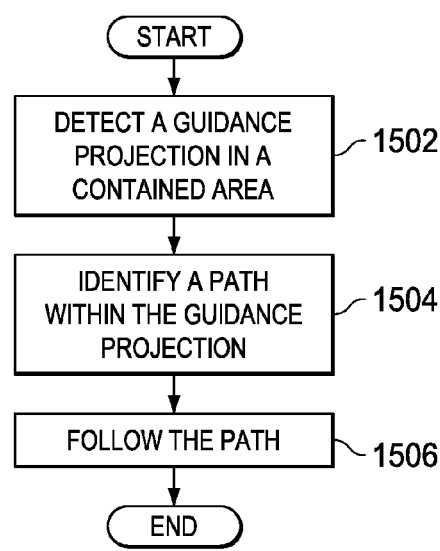
FIG. 15 is a flowchart illustrates a process for navigating a path in accordance with an illustrative embodiment.

With reference now to FIG. 15, a flowchart illustrates a process of navigating a path in accordance with an illustrative embodiment. This process may be implemented by a number of mobile robotic devices 346 in FIG. 3.

The process starts by detecting a guidance projection in a contained area (step 1502). The process identifies a path within the guidance projection (step 1504). A path may be a line path such as line path 714 in FIG. 7, a number of behavior codes such as number of behavior codes 704 in FIG. 7, or a combination of a line path and behavior codes, for example. The process follows the path (step 1506), with the process terminating thereafter. Subsequent to the process terminating, the mobile robotic device may be returned to a storage location, such as storage location 120 in FIG. 1. The mobile robotic device may return to a storage location by either follow a structured light projection or following instructions from an operator implementing a tele-operation process, for example.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Additionally, as used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations. As used herein, a number of items means one or more items.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The different illustrative embodiments recognize and take into account that currently used methods for robotic navigation rely on dead reckoning or localization and path planning. Systems which rely on dead reckoning are inexpensive but inefficient. Given enough time, a system relying on dead reckoning or random area coverage will probably cover the work area. However, the amount of time for 99.99% certainty that the total work area is covered may be very long. Additionally, systems which rely on localization and path planning system are more accurate and efficient in area coverage but often cost-prohibitive. One example of a localization and path planning system is a global positioning system using satellites. Precise area coverage can be achieved using this localization system. However, the main drawbacks are cost, energy consumption (e.g., battery operation reduction), and accuracy issues due to satellite signal obstructions. Signals from satellites may be replaced with acoustic or electromagnetic signals from ground sources which are then used by mobile robotic devices to triangulate position. However, overcoming accuracy requirement issues from signal topology, multi-path, attenuation, as well as power supply needs for beacons increases the system costs.

Thus, one or more of the different illustrative embodiments provide an apparatus that includes a computer system, a number of structured light generators, and a number of mobile robotic devices. The computer system is configured to generate a path plan. The number of structured light generators is configured to project the path plan. The number of mobile robotic devices is configured to detect and follow the path plan.

An illustrative embodiment further provides a method and system for providing a path plan. A guidance projection using a three-dimensional map is generated. The guidance projection is then projected onto a contained area.

An additional illustrative embodiment provides a method and system for navigating a path. A guidance projection in a contained are is detected. A path within the guidance projection is identified. The path is then followed.

Illustrative embodiments provide a guidance system for a mobile robotic device which enables safety, low cost, extended battery life or a smaller battery, and high quality area coverage. The illustrative embodiments contribute to a low robot weight which enhances safety, low cost, extended battery life or a smaller battery.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for guiding a mobile robotic device, the method comprising:
    receiving commands to generate a guidance projection for a path plan;
    responsive to receiving the commands, generating the guidance projection for the path plan using a three-dimensional map; and
    projecting the guidance projection onto a contained area, wherein the step of generating the guidance projection using the three dimensional map further comprises:
    identifying a number of umbral areas;
    responsive to identifying the number of umbral areas, creating a number of umbral guides; and
    generating the guidance projection using the three-dimensional map and the number of umbral guides, wherein the guidance projection is a structured light projection that comprises a discernible path.

2. The method of claim 1, wherein the guidance projection comprises a line path.

3. The method of claim 1, wherein the guidance projection comprises a number of behavior codes that contain navigational instructions for the mobile robotic device.

4. The method of claim 3, wherein the number of behavior codes are configured to guide the mobile robotic device after the guidance projection is no longer visible.

5. The method of claim 1, wherein the contained area is at least one of an inside environment and an outside environment, and further comprising steps of:
monitoring at least one object in the contained area; and
responsive to monitoring the at least one object in the contained area, modifying the path plan.

6. The method of claim 1, wherein the step of projecting the guidance projection onto the contained area is performed using multiple structured light generators.

7. The method of claim 6, where the guidance projection comprises a plurality of segments that are simultaneously projected using the multiple structured light generators.

8. The method of claim 6, where the guidance projection comprises a plurality of segments that are consecutively projected using the multiple structured light generators.

9. The method of claim 1, wherein the path plan is generated using a path planning algorithm.

10. The method of claim 1, further comprising steps of:
generating the path plan using a mapping process; and
communicating the generated path plan to a structured light generating process that projects the guidance projection onto the contained area.

11. The method of claim 1, wherein the path plan comprises a set of navigational instructions that define a path for the mobile robotic device to follow.

12. The method of claim 1, further comprising a step of:
tracking a position of the mobile robotic device relative to the guidance projection.

13. The method of claim 12, further comprising a step of:
responsive to tracking the position of the mobile robotic device relative to the guidance projection, modifying the path plan.

14. The method of claim 1, wherein generating the guidance projection using the three-dimensional map, further comprises:
creating a first three-dimensional map;
annotating the first three-dimensional map to form a second three-dimensional map;
creating a third three-dimensional map using the second three-dimensional map and current data; and
generating a guidance projection using the third three-dimensional map.

* * * * *